United States Patent
Ham

(10) Patent No.: US 10,744,406 B2
(45) Date of Patent: Aug. 18, 2020

(54) TEMPORAL AXIAL ALIGNMENT ADAPTER FOR VR HAND CONTROLLERS

(71) Applicant: North Carolina State University, Raleigh, NC (US)

(72) Inventor: Derek Allen Ham, Raleigh, NC (US)

(73) Assignee: North Carolina State University, Raleigh, NC (US)

(*) Notice: Subject to any disclaimer, the term of this patent is extended or adjusted under 35 U.S.C. 154(b) by 25 days.

(21) Appl. No.: 16/230,390

(22) Filed: Dec. 21, 2018

(65) Prior Publication Data
US 2020/0122026 A1    Apr. 23, 2020

Related U.S. Application Data

(63) Continuation-in-part of application No. 29/667,259, filed on Oct. 19, 2018.

(51) Int. Cl.
*A63F 13/24* (2014.01)
*G06F 3/01* (2006.01)
*G06F 3/033* (2013.01)

(52) U.S. Cl.
CPC .............. *A63F 13/24* (2014.09); *G06F 3/011* (2013.01); *G06F 3/033* (2013.01); *A63F 2300/308* (2013.01); *A63F 2300/8082* (2013.01)

(58) Field of Classification Search
None
See application file for complete search history.

(56) References Cited

U.S. PATENT DOCUMENTS

| 5,046,739 | A | * | 9/1991 | Reichow | A63F 13/02 273/148 B |
| 8,550,915 | B2 | * | 10/2013 | Ashida | A63F 13/02 463/37 |
| 9,711,980 | B2 | * | 7/2017 | Hodges | G06F 1/1632 |
| 2008/0261693 | A1 | * | 10/2008 | Zalewski | G06F 3/0304 463/31 |
| 2009/0038721 | A1 | * | 2/2009 | Wakitani | A63F 13/02 150/154 |
| 2009/0088248 | A1 | * | 4/2009 | Stevens | A63F 13/02 463/36 |
| 2009/0298590 | A1 | * | 12/2009 | Marks | A63F 13/02 463/37 |

(Continued)

*Primary Examiner* — Tramar Y Harper
(74) *Attorney, Agent, or Firm* — Thomas Horstemeyer, LLP

(57) ABSTRACT

Various examples are provided for adapters for virtual reality (VR) hand controllers. The adapters can be coupled to hold the VR controllers in temporal axial alignment. In one example, an adapter includes a first end, a second end and one or more cross members connecting the first and second ends. The first end can include a controller recess configured to secure a VR hand controller in a fixed alignment with a longitudinal axis of the adapter. The first and second ends can include first and second alignment recesses configured to receive a coupling assembly that can be used to couple adapters together in a fixed alignment. For example, the coupling assembly can magnetically couple adapters together. In another example, a system including two adapters can be coupled together to hold VR hand controllers in a fixed orientation with each other, e.g., in temporal axial alignment.

20 Claims, 7 Drawing Sheets

(56) References Cited

U.S. PATENT DOCUMENTS

| | | | |
|---|---|---|---|
| 2010/0178981 A1* | 7/2010 | Holcomb | A63B 21/0603 |
| | | | 463/37 |
| 2011/0034250 A1* | 2/2011 | Brandt | A61F 13/06 |
| | | | 463/37 |
| 2011/0190056 A1* | 8/2011 | Xu | A63F 9/24 |
| | | | 463/36 |
| 2011/0260969 A1* | 10/2011 | Workman | A63F 13/24 |
| | | | 345/161 |
| 2011/0275437 A1* | 11/2011 | Minchella Jennings | |
| | | | A63F 13/98 |
| | | | 463/38 |
| 2012/0088582 A1* | 4/2012 | Wu | A63F 13/211 |
| | | | 463/37 |
| 2012/0122576 A1* | 5/2012 | Mao | A63F 13/245 |
| | | | 463/32 |
| 2012/0190448 A1* | 7/2012 | Larsen | A63F 13/04 |
| | | | 463/36 |
| 2012/0202597 A1* | 8/2012 | Yee | A63F 13/843 |
| | | | 463/37 |
| 2014/0066206 A1* | 3/2014 | Gale | A63F 13/211 |
| | | | 463/37 |
| 2016/0361637 A1* | 12/2016 | Higgins | A63F 13/24 |
| 2017/0128828 A1* | 5/2017 | Long | A63F 13/235 |
| 2017/0242486 A1* | 8/2017 | Grant | A63F 13/211 |
| 2019/0176033 A1* | 6/2019 | Ironmonger | A63F 13/24 |
| 2019/0308110 A1* | 10/2019 | Muramatsu | A63F 13/24 |

* cited by examiner

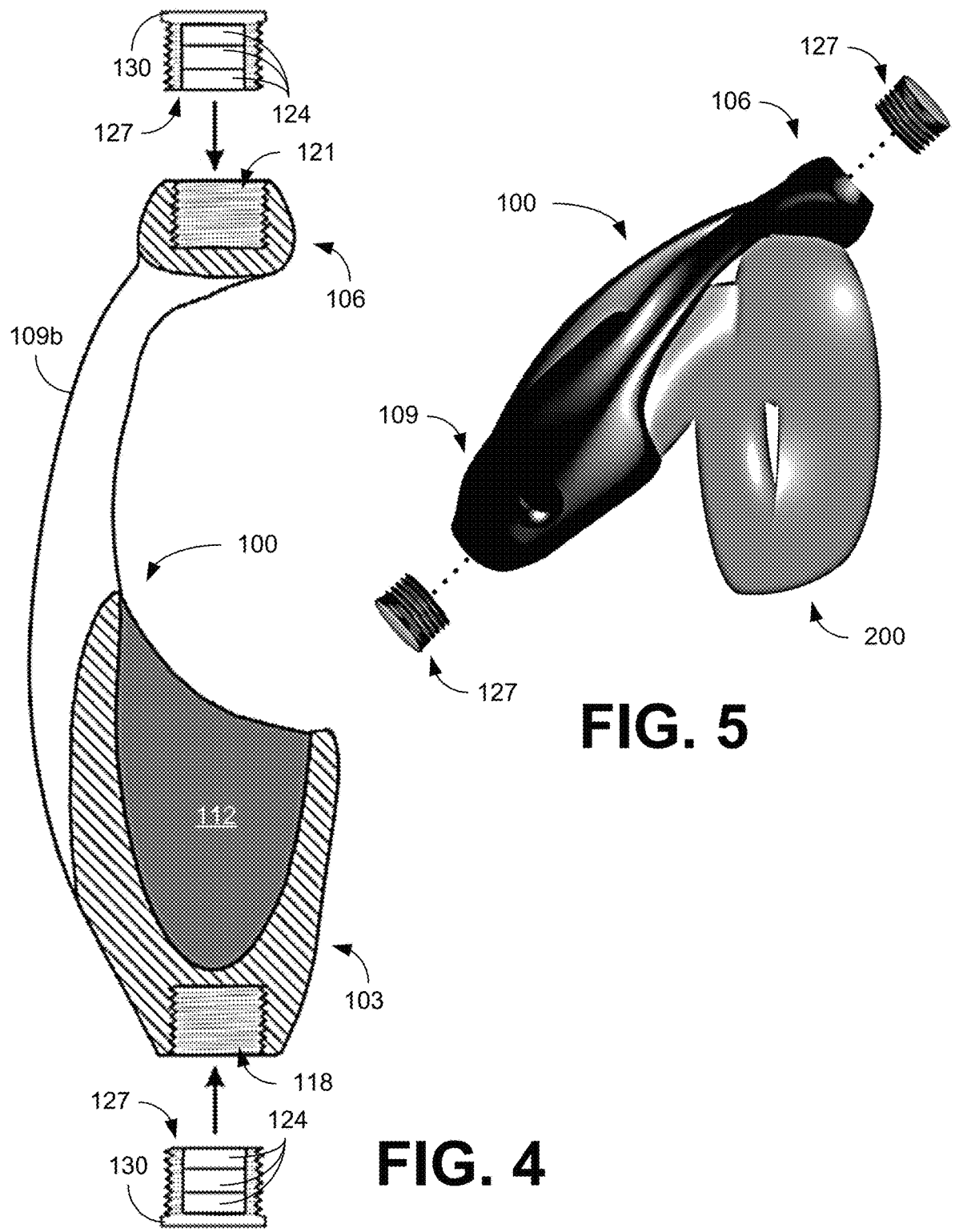

TEMPORAL AXIAL ALIGNMENT ADAPTER FOR VR HAND CONTROLLERS

CROSS REFERENCE TO RELATED APPLICATIONS

This application claims priority to, and the benefit of, co-pending U.S. design application entitled "Temporal Axial Alignment Adapter for VR Hand Controller" having Ser. No. 29/667,259, filed Oct. 19, 2018, the entirety of which is hereby incorporated by reference.

BACKGROUND

Virtual reality (VR) applications can be applied to a wide range of settings such as education, healthcare, entertainment, aviation, military, construction and industrial settings in addition to gaming. VR systems are typically implemented on a computing device, and generally include both visual and audio interfaces to immerse a user in a three-dimensional (3D) virtual environment. The most common interfaces are head mounted displays that surround the eyes to provide 3D visual and headphones for 3D audio. Hand controllers provide means for input in response to the VR stimulation received through the interfaces. The VR system can track the position and orientation of the user's head in order to provide appropriate perspectives, and other body parts to allow for interaction with the VR environment.

SUMMARY

Aspects of the present disclosure are related to adapters for VR hand controllers, which can provide alignment of the VR hand controllers. In one aspect, among others, an adapter comprises a first end, a second end and one or more cross members connecting the first end to the second end of the adapter. The first end can comprise a controller recess configured to secure a VR hand controller in a fixed alignment with a longitudinal axis of the adapter and a first alignment recess extending inward from an end surface of the first end towards the controller recess. The second end can comprise a second alignment recess extending inward from an end surface of the second end. The longitudinal axis can extend through a center of the first alignment recess and a center of the second alignment recess. An end cap can be secured in the first alignment recess or the second alignment recess, the end cap comprising magnet components configured to magnetically couple the first end or the second end of the adapter to a first end or a second end of another adapter. The magnetic coupling can provide temporal axial alignment of the adapters.

In various aspects, the adapter can comprise a second end cap secured in the first alignment recess or the second alignment recess. A portion of the VR hand controller can engage with the controller recess to secure the VR hand controller in the fixed alignment with the longitudinal axis of the adapter. A handle of the VR hand controller can be inserted in the controller recess to align the VR hand controller with the longitudinal axis of the adapter. The first end can comprise a safety opening adjacent to the closed end of the controller recess, the safety opening allowing a safety attachment to extend from the controller recess. The safety attachment can be a wrist strap secured to the VR hand controller. In one or more aspects, an inner surface of the first and second alignment recesses and an outer surface of the end cap are threaded to secure the end cap in the first alignment recess or the second alignment recess. The first end of the adapter can be magnetically coupled to the first end of the other adapter. The first end of the adapter can be magnetically coupled to the second end of the other adapter. The second end of the adapter can be magnetically coupled to the second end of the other adapter.

In another aspect, a system comprises a first adapter comprising a first end, a second end and one or more cross members connecting the first and second ends of the first adapter, the first end comprising a controller recess configured to secure a first VR hand controller in a fixed alignment with a longitudinal axis of the first adapter. The system can further comprise a second adapter comprising a first end, a second end and one or more cross members connecting the first and second ends of the first adapter, the first end comprising a controller recess configured to secure a second VR hand controller in a fixed alignment with a longitudinal axis of the second adapter. The first adapter can be coupled to the second adapter in a fixed temporal orientation via a first coupling assembly installed in the first end or the second end of the first adapter and a second coupling assembly installed in the first end or the second end of the second adapter. In various aspects, the first coupling assembly can be affixed in a first alignment recess of the first adapter, the first alignment recess centered about the longitudinal axis of the first adapter, and the second coupling assembly can be affixed in a second alignment recess of the second adapter, the second alignment recess centered about the longitudinal axis of the second adapter. The longitudinal axis of the first adapter can be in temporal axial alignment with the longitudinal axis of the second adapter. The first coupling assembly of the first adapter can magnetically couple to the second coupling assembly of the second adapter.

In one or more aspects, the first end of the first adapter can comprise a first alignment recess extending inward from an end surface of the first end towards the controller recess, and the second end of the first adapter can comprise a second alignment recess extending inward from an end surface of the second end. The first end of the second adapter can comprise a third alignment recess extending inward from an end surface of the first end towards the controller recess, and the second end of the second adapter can comprise a fourth alignment recess extending inward from an end surface of the second end. A first end cap comprising magnet components can be secured in the first or second alignment recess, and a second end cap comprising magnet components can be secured in the third or fourth alignment recess. The first and second end caps can be configured to magnetically couple the first or the second end of the first adapter to the first or second end of the second adapter the first end of the first and second adapters comprise a safety opening adjacent to the closed end of the controller recess, the safety opening allowing access to a safety attachment of the first and second VR hand controllers. The first end of the first and second adapters can comprise a safety opening adjacent to the closed end of the controller recess, where the safety opening allows access to a safety attachment of the first and/or second VR hand controllers. The safety attachment can be a wrist strap secured to the first or second VR hand controller. The first adapter can be coupled to the second adapter in a fixed temporal orientation via an extension bar coupled between the first coupling assembly and the second coupling assembly. The first adapter can be held in temporal axial alignment with the second adapter through the extension bar.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 4 is a cross-sectional view of the temporal axial alignment adapter of FIG. 1, in accordance with various embodiments of the present disclosure.

FIG. 5 is a graphical illustration of a VR controller installed in the temporal axial alignment adapter of FIG. 1, in accordance with various embodiments of the present disclosure.

DETAILED DESCRIPTION

Figure 1:
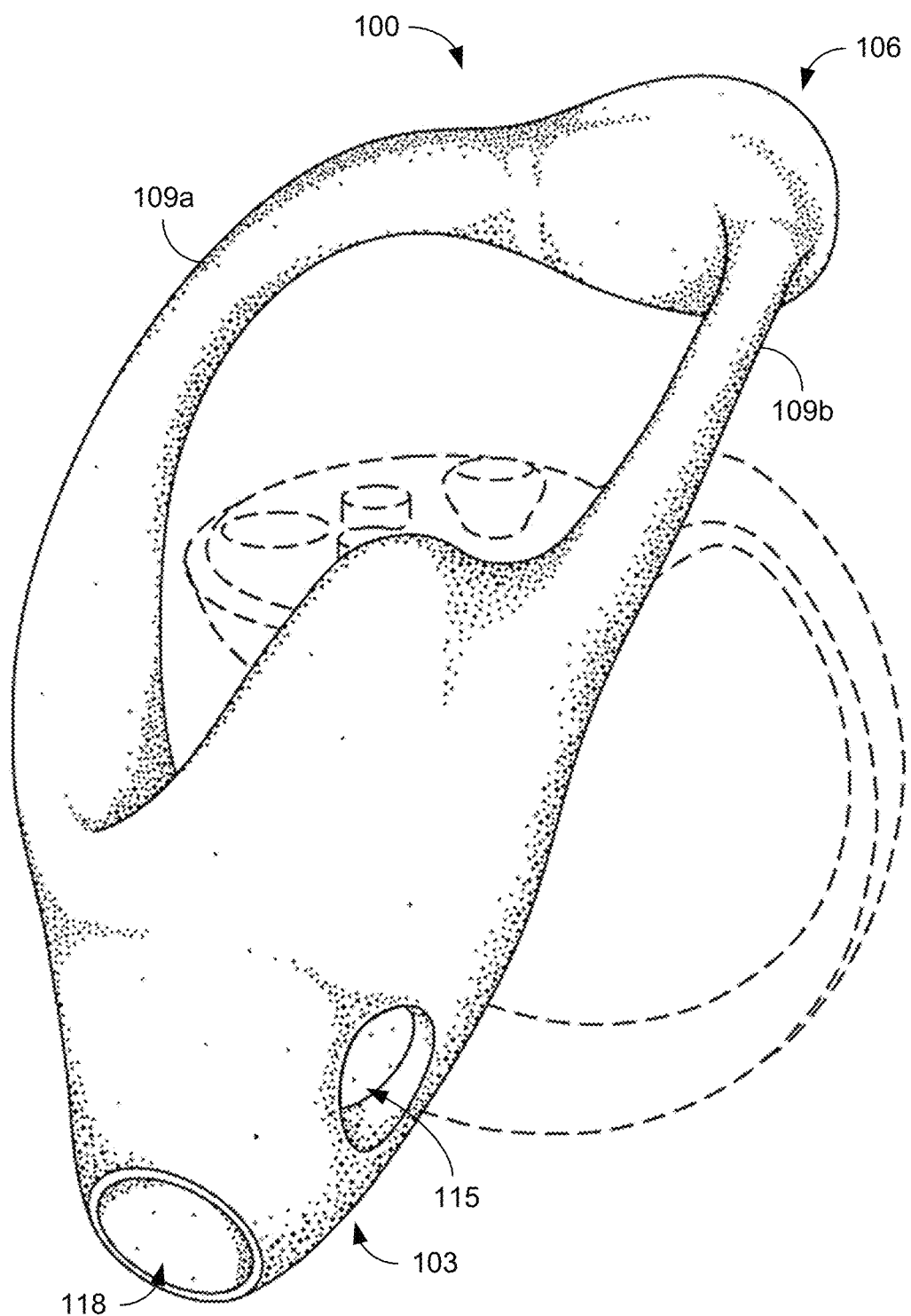
FIG. 1 is a perspective view of an example of a temporal axial alignment adapter, in accordance with various embodiments of the present disclosure.

Disclosed herein are various embodiments related to adapters for VR hand controllers. The adapters can provide temporal axial alignment of the VR hand controllers. Reference will now be made in detail to the description of the embodiments as illustrated in the drawings, wherein like reference numbers indicate like parts throughout the several views.

VR games (or applications) are not typically designed or played with the user's hands in axial alignment. Those VR experiences that do require this action try to compensate for the controllers inability to physically align with each other. The disclosed adapters allow the hand controllers to be positioned and temporally locked into a fixed axial alignment. The VR hand controllers can be slipped into controller recesses in corresponding adapters, which hold the controllers in the adapters. The adapters are designed to allow the VR controllers to be locked into axial alignment. For VR usage, coupling of the VR controllers in a fixed alignment improves any scenario in which hands need to be aligned on axis to grab or interact with virtual objects.

Referring to FIG. 1, shown a perspective view of an example of a temporal axial alignment adapter 100. The adapter 100 includes a first end 103 configured to receive a VR hand controller and a second end 106 opposite the first end 103. The first and second ends 103 and 106 are connected by one or more cross members 109 (e.g., 109a and 109b), which secure the first end 103 and second end 106. The cross members 109 can be located at various positions about the adapter 100. The shape of the first end 103, second end 106 and cross members 109 can be designed to provide an aesthetically pleasing appearance, which can be sleek and streamlined as illustrated in FIG. 1. Referring next to FIGS. 2A-2D, shown are side views of the temporal axial alignment adapter 100 of FIG. 1. The first and second ends 103 and 106 of the adapter 100 are connected by cross members 109, which secure the first end 103 and second end 106 in alignment along a longitudinal axis (dashed line) of the adapter 100. The cross members 109 can be located at various positions about the longitudinal axis to connect the first and second ends 103 and 106.

As illustrated in FIGS. 2A-2D, the first end 103 is larger than the second end 106, and is configured to receive at least a portion of a VR hand controller in a controller recess 112. The controller recess 112 includes an open end to receive the VR controller. Various portions of the VR controller can make contact with the inner surface of the controller recess 112 at one or more locations, thereby holding the VR controller in alignment with the longitudinal axis of the adapter 100. The controller recess 112 can be closed opposite the open end, and the shape of the inner surface can be varied as is desired to allow for the insertion of one or more types of VR controllers. In some implementations, an ejection opening can be provided at the closed end of the controller recess 112 (e.g., aligned with the longitudinal axis) to aid in the removal of the VR controller from the adapter 100. This ejection opening may be sized to allow a finger or other instrument to access a portion of the installed VR controller so that pressure can be applied to assist with removal of the VR controller from the adapter 100. A removable cover can be provided to seal the ejection opening when the adapter 100 is being used.

The first end 103 also includes a safety opening 115 adjacent to the closed end of the controller recess 112 to allow a wrist strap (or other safety attachment) on the VR controller to pass through the adapter 100. While a circular opening is illustrated, other shapes for the safety opening 115 (e.g., oval or other geometric shape) can be utilized as desired. The sidewall of the safety opening 115 can be tapered outward such that the size of the safety opening 115 is larger at the outer surface of the adapter 100 and smaller at the inner surface of the controller recess 112.

Figures 2A, 2B:
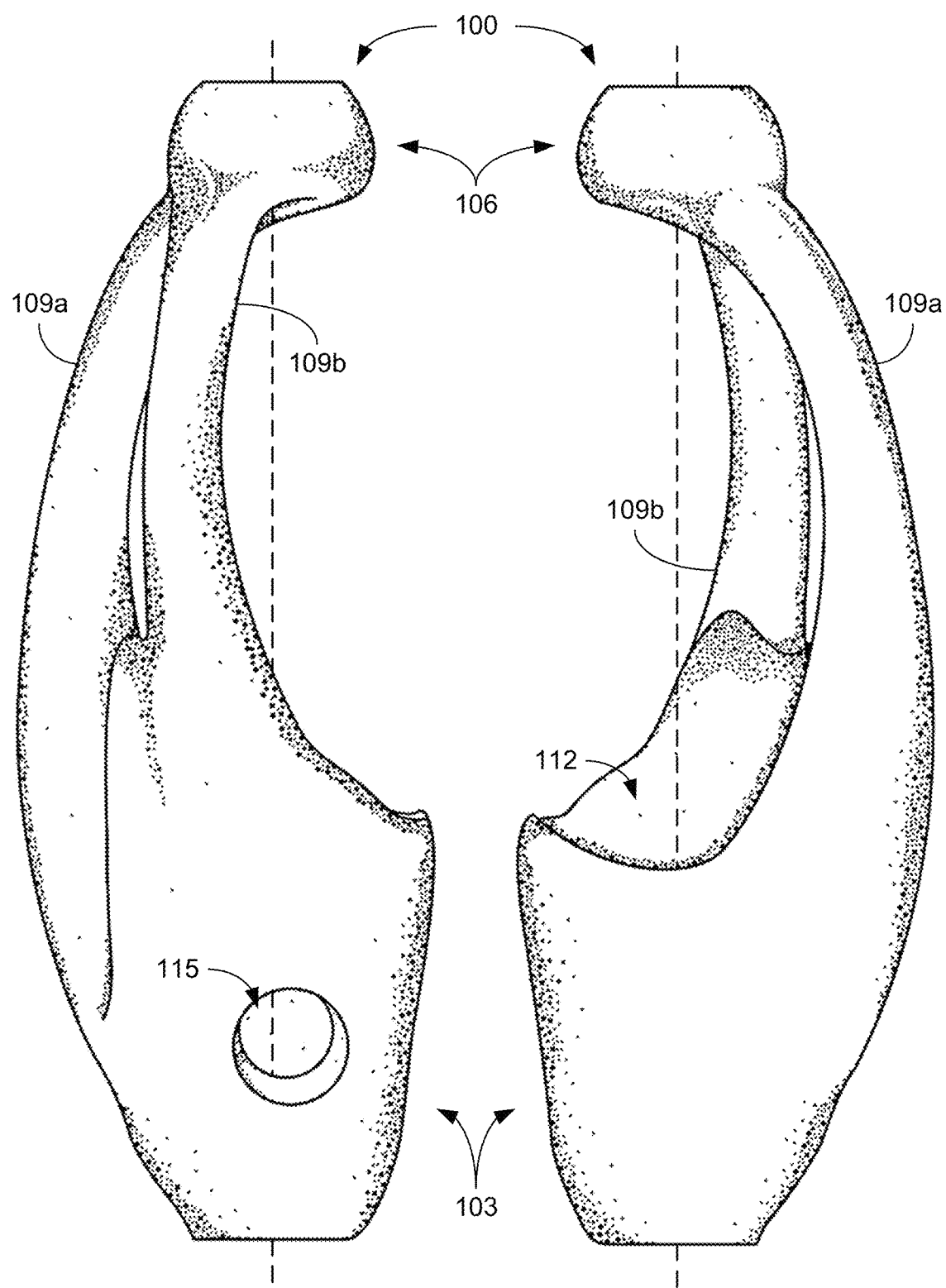
FIGS. 2A-2D are side views of the temporal axial alignment adapter of FIG. 1, in accordance with various embodiments of the present disclosure.
Figures 2C, 2D:
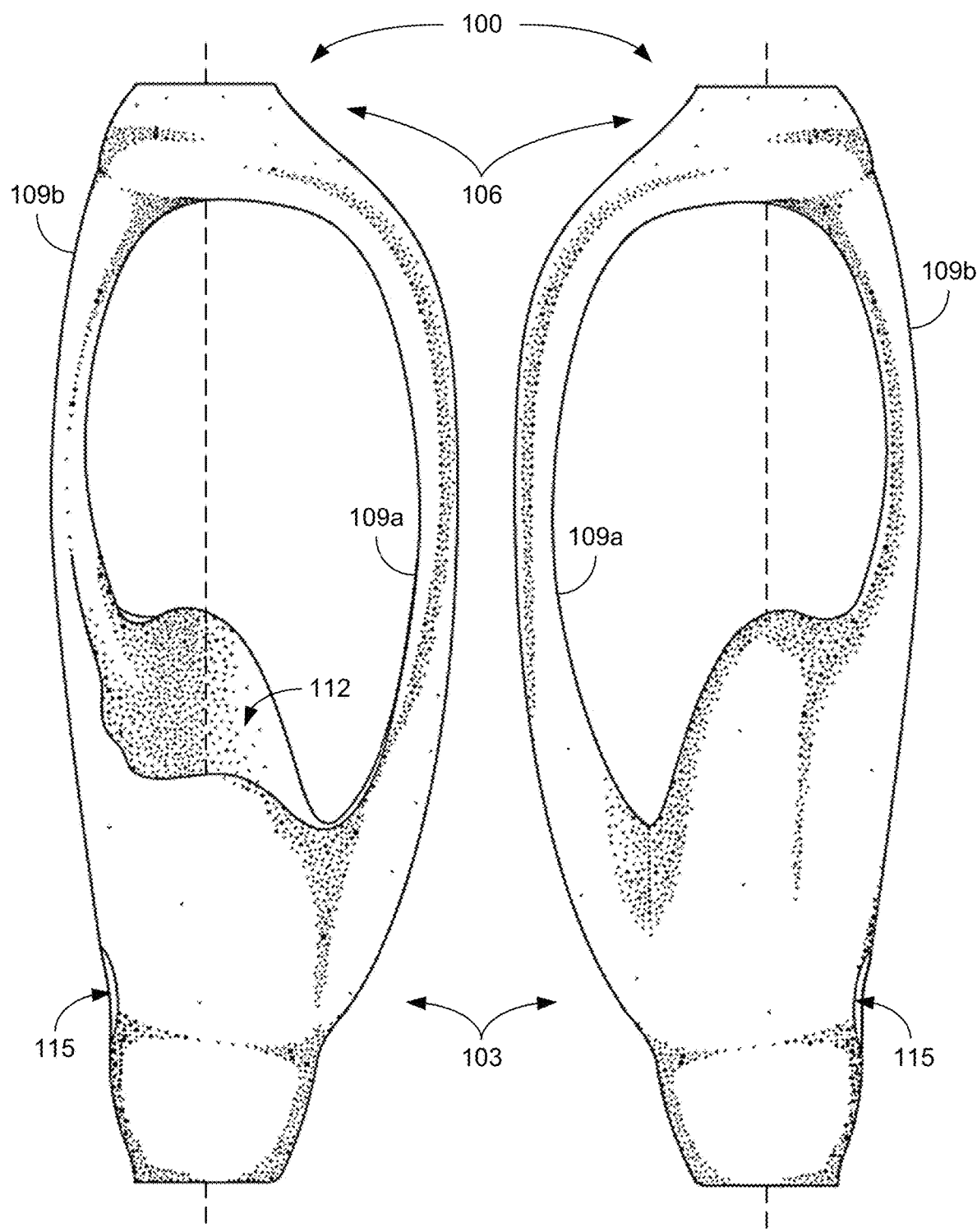

The shape and positioning of the cross members 109 can be varied to provide a desired appearance while allowing access of the VR controller to the controller recess 112. In the example of FIGS. 1 and 2A-2D, a first cross member 109a curves outward from the second end 106 and curves back inward to attach to the first end 103, while a second cross member 109b follows a path that while slightly curved is substantially parallel with the longitudinal axis. The diameters of the cross members 109 are reduced in the center sections to provide a clean look and feel, and to blend with the overall appearance of the adapter 100. As can be seen in FIGS. 2A and 2B, the cross members 109 are offset to one side of the longitudinal axis to facilitate access to the controller recess 112. In addition, the open end of the controller recess 112 can be lower on one side as shown in FIG. 2C to aid in the insertion of the VR controller into the adapter 100.

Figure 3A:
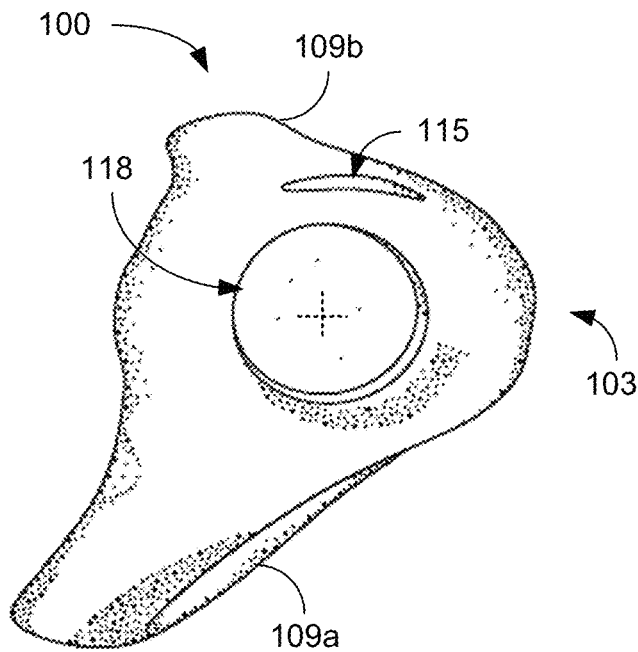
FIGS. 3A and 3B are end views of the temporal axial alignment adapter of FIG. 1, in accordance with various embodiments of the present disclosure.
Figure 3B:
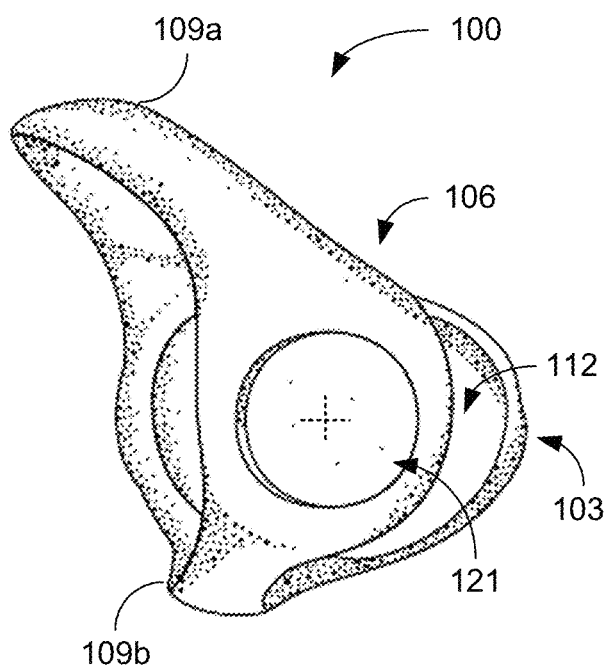

Referring now to FIGS. 3A and 3B, shown are views of the first and second ends 103 and 106 of the temporal axial alignment adapter 100 of FIG. 1, respectively. As illustrated in FIG. 3A, the first end 103 of the adapter 100 includes the safety opening 115 to allow a wrist strap (or other safety attachment) on the VR controller to pass through the adapter 100. In addition, the first end 103 includes a first alignment recess 118 centered about the longitudinal axis of the adapter 100. The first alignment recess 118 extends inward from the end of the adapter 100 towards the closed end of the controller recess 112. The second end 106 of the adapter 100 includes a second alignment recess 121 centered about the longitudinal axis of the adapter 100. The second alignment recess 121 extends inward from the end of the adapter 100. The depth of the alignment recesses 118 and 121 can be based upon a coupling assembly used to temporally lock the adapters 100 into a fixed axial alignment.

This may be better illustrated in the cross-sectional view of FIG. 4, which shows the first alignment recess 118 extending into the first end 103 of the adapter 100 but stopping before the controller recess 112 is reached. In some implementations, the first alignment recess 118 can extend inward to the controller recess 112, providing access to the closed end of the controller recess 112 through an ejection opening formed between the controller recess 112 and alignment recess 118. The size of the ejection opening can be less than the diameter of the alignment recess 118 to provide a lip (or stopping surface) at the end of the first alignment recess 118. This can limit the depth that the coupling assembly can be inserted into the first alignment recess 118 and avoid insertion into the controller recess 112. Similarly, FIG. 4 shows the second alignment recess 121 extending into the second end 106 but stopping before passing through the second end 106 of the adapter 100. While the second alignment recess 121 can be extended through the second end 106 of the adapter 100 in some embodiments, a smooth outer surface can be maintained by not extending the second alignment recess 121 through the second end 103.

In the example of FIG. 4, the coupling assembly includes magnetic components 124 (e.g., permanent magnets) that can be inserted into the alignment recesses 118 and 121, and secured in position using an end cap 127 surrounding the magnet components 124. As shown in FIG. 4, the magnet components 124 can be removably inserted into the end caps 127 or can be molded into the end caps 127. The end caps 127 can then be secured in the alignment recesses 118 and 121 using, e.g., a friction fit or other appropriate means. In various embodiments, the end cap 124 can be affixed within the alignment recesses 118 and 121 by threads that can be screwed together as illustrated in FIG. 4, tabs that can be locked into corresponding slots, or other appropriate attachment device. For example, tabs can be located on the outer surface of the end cap 127 or the inner surface of the alignment recess 118 or 121 with corresponding slots located on the inner surface of the alignment recess 118 or 121 or the outer surface of the end cap 127. The slots can be L-shaped allowing the tabs to be inserted into the slot and twisted to lock the end cap 127 in position. The end cap 127 can be designed to be secured in the alignment recess 118 or 121 with the end cover 130 of the end cap 127 extending over a portion of an end surface of the first end 103 or second end 106, or with the external surface of the end cover 130 substantially aligned with the end surface of the first end 103 to provide a smooth surface for coupling.

The end caps 127 can be reconfigurable to allow for different couplings of the adapters 100. To this end, the end caps 127 include slots, recesses or tabs that can facilitate insertion of the end caps 127 into, and removal from, the alignment recesses 118 and 121. Other coupling assemblies such as, e.g., threaded rods or fittings or snap-fit connectors can be used to secure the adapters in temporal axial alignment. In addition, the alignment recesses 118 and 121 allow a variety of add on fixtures to be attached between the coupled adapters 100. For instance, an extension bar can be positioned between the adapters 100 providing an extended length between the VR controllers to simulate different configurations (e.g., a paddle for simulated kayaking). The extension bar can include magnet components (or other coupling assembly) at the two ends of the extension bar, allowing it to be removably connected between the adapters 100. The magnet components can be secured in alignment recesses at the ends of the extension bar, or can be molded in the ends. In some cases, the extension bar can be angled or curved to hold the VR controllers in a fixed orientation that is not axially aligned.

FIG. 5 graphically illustrates an example of a VR hand controller 200 installed in the adapter 100 of FIG. 1. A portion of the VR controller 200 is inserted into the controller recess 112 to hold the VR controller between the first and second ends of the adapter 100, and in a fixed alignment with the longitudinal axis of the adapter 100. As shown in FIG. 5, a handle of the VR controller 200 can be inserted into the controller recess 112 to align the VR controller 200 with the longitudinal axis. The end caps 127 including magnet components 124 are secured in alignment recesses 118 and 121 located at the first and second ends 103 and 106, and centered about the longitudinal axis of the adapter 100.

Figure 6A:
FIGS. 6A-6D are images showing various coupling arrangements of VR controllers installed in the temporal axial alignment adapters of FIG. 1, in accordance with various embodiments of the present disclosure.
Figure 6B:
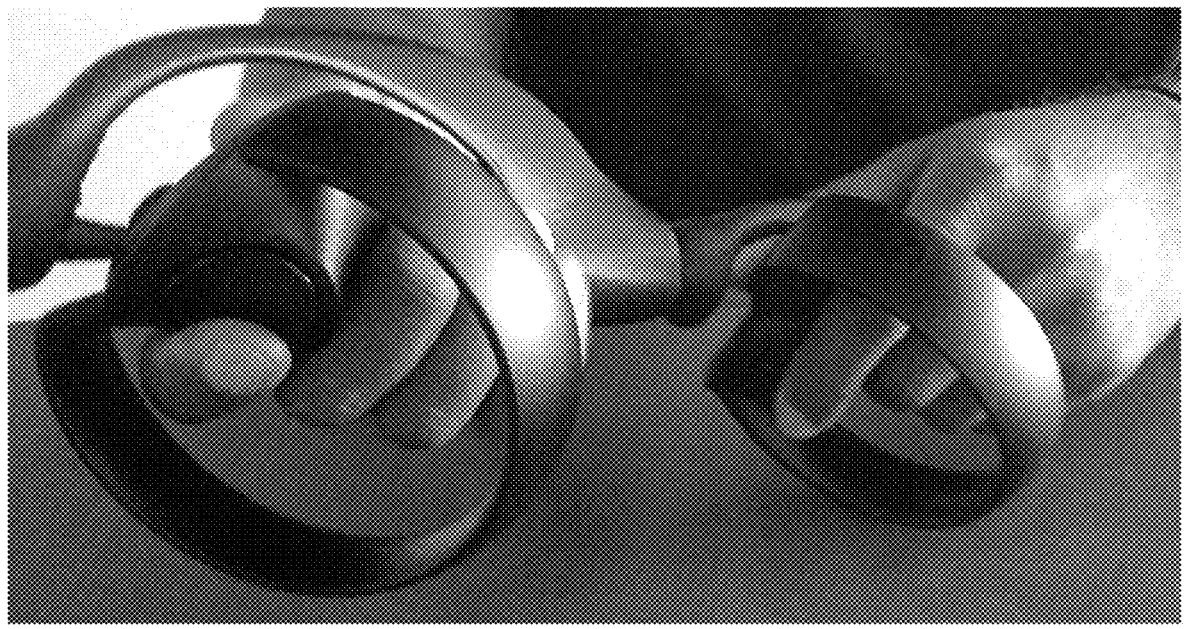
Figure 6C:
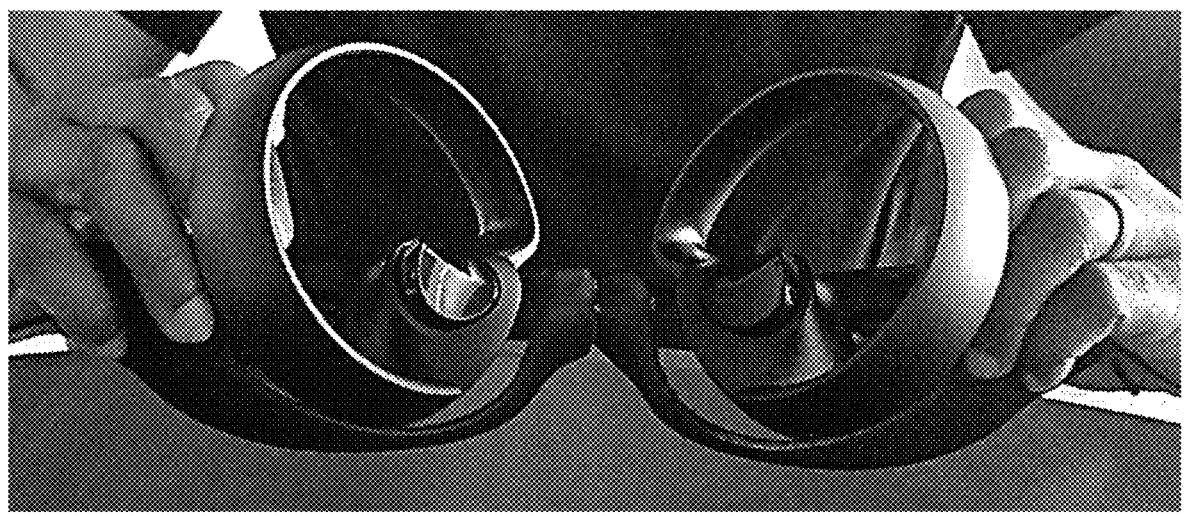
Figure 6D:

By appropriate selection of the magnet components 124, adapters 100 can be magnetically coupled together with the longitudinal axes aligned with each other. The first end 103 of one adapter 100 can be coupled to the first end 103 of another adapter 100, as shown in the image of FIG. 6A, or the first end 103 of one adapter 100 can be coupled to the second end 106 of another adapter 100, as shown in the image of FIG. 6B, or the second end 106 of one adapter 100 can be coupled to the second end 106 of another adapter 100, as shown in the image of FIG. 6C. The images of FIGS. 6A, 6B and 6D illustrate how a user can grip the VR hand controllers 200 while they are held in a fixed temporal axial alignment by the adapters 100 coupled in the different configurations. The ability to quickly disconnect the adapters 100, and reconfigure the end caps 127 with the magnet components 124 (or other coupling assemblies) allows the adapters 100 to be used in a wide range of applications.

VR hand controllers can be secured in adapters 100 by feeding a wrist strap (or other safety attachment) on a handle of the VR controller through the safety opening 115 from the controller recess 112 to the outside of the adapter 100. The wrist strap can be pulled out as the handle of the VR hand controller is inserted into the controller recess 112. With the controller recess 112 extending along the longitudinal axis of the adapter 100, the handle of the VR controller can be held in fixed alignment with the longitudinal axis. By extending the cross members 109 between the first and second ends 103 and 106 on one side of the controller recess 112 can allow better access to the controller recess 112 for insertion of the VR controller. Lowering the side of the opening opposite the cross members 109 can also improve accessibility.

With the VR hand controllers held in the controller recesses 112, the adapters can be coupled together using a coupling assembly such as, e.g., end caps 127 comprising magnet components 124 (or other appropriate coupling assembly). By aligning the end caps 127 on the first and/or second ends 103/106, the adapters 100 can be magnetically coupled together in temporal axial alignment. In some cases, an extension bar can be positioned between the adapters 100 to extend the separation between the VR controllers. The ends of the extension bar can include coupling assemblies that can couple with the ends of the adapters 100. For example, magnet components can be installed in the ends of the extension bar for magnetic coupling with the first and/or second ends 103/106 of the adapters 100.

A straight extension bar can be used to align the longitudinal axis of the adapters 100 to be linearly aligned. If the extension bar is curved or bent, then the longitudinal axes of the adapters 100 can be held in a fixed orientation (e.g., the longitudinal axes are offset from each other by an angle defined by the shape of the extension bar). With the magnetic coupling, the adapters 100 can be decoupled from each other by the user and recoupled in a different orientation. The magnetic coupling can also allow the adapters 100 to be rotated about the longitudinal axis with respect to each other.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. An adapter for aligning virtual reality (VR) hand controllers, comprising:
    a first end comprising a controller recess configured to secure a VR hand controller in a fixed alignment with a longitudinal axis of the adapter and a first alignment recess extending inward from an end surface of the first end towards the controller recess;
    a second end comprising a second alignment recess extending inward from an end surface of the second end;
    one or more cross members connecting the first end to the second end of the adapter, where the longitudinal axis extends through a center of the first alignment recess and a center of the second alignment recess; and
    an end cap secured in the first alignment recess or the second alignment recess, the end cap comprising magnet components configured to magnetically couple the first end or the second end of the adapter to a first end or a second end of another adapter, the magnetic coupling providing temporal axial alignment of the adapters.

2. The adapter of claim 1, comprising a second end cap secured in the first alignment recess or the second alignment recess.

3. The adapter of claim 1, wherein a portion of the VR hand controller engages with the controller recess to secure the VR hand controller in the fixed alignment with the longitudinal axis of the adapter.

4. The adapter of claim 3, wherein a handle of the VR hand controller is inserted in the controller recess to align the VR hand controller with the longitudinal axis of the adapter.

5. The adapter of claim 1, wherein the first end further comprises a safety opening adjacent to a closed end of the controller recess, the safety opening allowing a safety attachment to extend from the controller recess.

6. The adapter of claim 5, wherein the safety attachment is a wrist strap secured to the VR hand controller.

7. The adapter of claim 1, wherein an inner surface of the first and second alignment recesses and an outer surface of the end cap are threaded to secure the end cap in the first alignment recess or the second alignment recess.

8. The adapter of claim 1, wherein the first end of the adapter is magnetically coupled to the first end of the other adapter.

9. The adapter of claim 1, wherein the first end of the adapter is magnetically coupled to the second end of the other adapter.

10. The adapter of claim 1, wherein the second end of the adapter is magnetically coupled to the second end of the other adapter.

11. A system for virtual reality (VR) hand controller alignment, comprising:
    a first adapter comprising a first end, a second end and one or more cross members connecting the first and second ends of the second adapter, the first end comprising a controller recess configured to secure a first VR hand controller in a fixed alignment with a longitudinal axis of the first adapter;
    a second adapter comprising a first end, a second end and one or more cross members connecting the first and second ends of the second adapter, the first end comprising a controller recess configured to secure a second VR hand controller in a fixed alignment with a longitudinal axis of the second adapter; and
    the first adapter coupled to the second adapter in a fixed temporal orientation via a first coupling assembly installed in the first end or the second end of the first adapter and a second coupling assembly installed in the first end or the second end of the second adapter.

12. The system of claim 11, wherein the first coupling assembly is affixed in a first alignment recess of the first adapter, the first alignment recess centered about the longitudinal axis of the first adapter, and the second coupling assembly is affixed in a second alignment recess of the second adapter, the second alignment recess centered about the longitudinal axis of the second adapter.

13. The system of claim 12, wherein the longitudinal axis of the first adapter is in temporal axial alignment with the longitudinal axis of the second adapter.

14. The system of claim 13, wherein the first coupling assembly of the first adapter magnetically couples to the second coupling assembly of the second adapter.

15. The system of claim 11, wherein:
- the first end of the first adapter comprises a first alignment recess extending inward from an end surface of the first end towards the controller recess, and the second end of the first adapter comprises a second alignment recess extending inward from an end surface of the second end; and
- the first end of the second adapter comprises a third alignment recess extending inward from an end surface of the first end towards the controller recess, and the second end of the second adapter comprises a fourth alignment recess extending inward from an end surface of the second end.

16. The system of claim 15, wherein a first end cap comprising magnet components is secured in the first or second alignment recess, and a second end cap comprising magnet components is secured in the third or fourth alignment recess, the first and second end caps configured to magnetically couple the first or the second end of the first adapter to the first or second end of the second adapter.

17. The system of claim 11, wherein the first end of the first and second adapters comprise a safety opening adjacent to a closed end of the controller recess, the safety opening allowing access to a safety attachment of the first and second VR hand controllers.

18. The system of claim 17, wherein the safety attachment is a wrist strap secured to the first or second VR hand controller.

19. The system of claim 11, wherein the first adapter is coupled to the second adapter in a fixed temporal orientation via an extension bar coupled between the first coupling assembly and the second coupling assembly.

20. The system of claim 19, wherein the first adapter is held in temporal axial alignment with the second adapter through the extension bar.

* * * * *